July 9, 1929.　　　T. L. FRATES　　　1,719,973
EGG BEATER
Filed Dec. 3, 1927
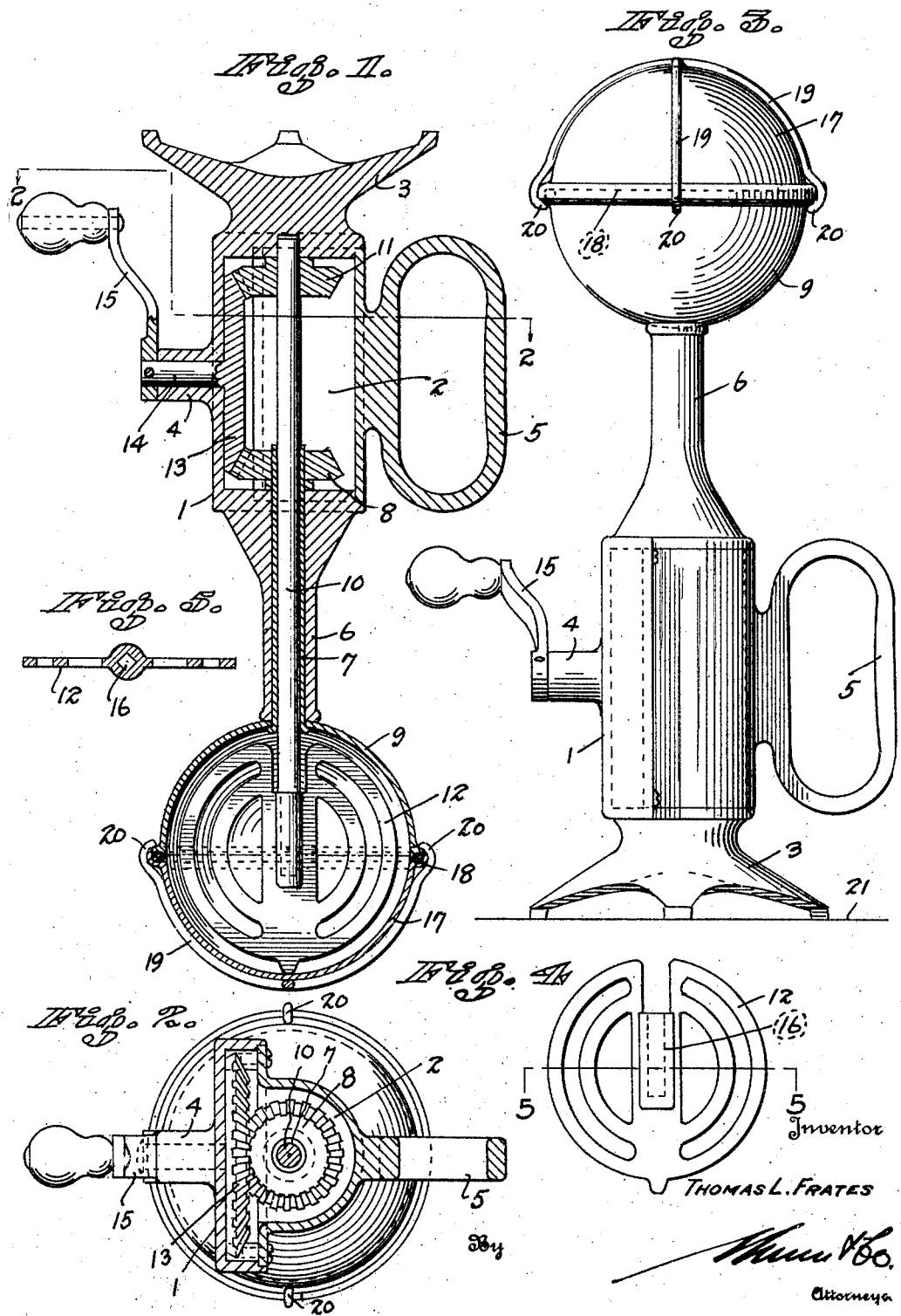
Inventor
Thomas L. Frates
Attorneys Patented July 9, 1929.

1,719,973

UNITED STATES PATENT OFFICE.

THOMAS L. FRATES, OF CONCORD, CALIFORNIA.

EGG BEATER.

Application filed December 3, 1927. Serial No. 237,470.

My invention relates to improvements in egg beaters, and it consists of the combinations, constructions and arrangements hereinafter described and claimed.

An object of my invention is to provide an egg beater in which the mechanism is entirely enclosed, and in which the egg is entirely enclosed during the beating operation, thus preventing the egg from being splashed over the operator or surrounding objects.

A further object of my invention is to provide a device of the type described that makes use of a housing for holding the egg, and revolves this housing and also an egg-beating element disposed on the inside of the housing. The device is portable and may be held in one hand while being rotated with the other, and in such a position as to prevent the contents of the egg from running down into the gear mechanism.

Other objects and advantages will appear in the following specification, and the novel features of the device will be particularly pointed out in the appended claims.

My invention is illustrated in the accompanying drawing forming a part of this application, in which Figure 1 is a vertical section through the device;

Figure 2 is a section along the line 2—2 of Figure 1;

Figure 3 is a side elevation of the device showing it inverted from that position shown in Figure 1;

Figure 4 is a view of the beating element; and

Figure 5 is a section along the line 5—5 of Figure 4.

In carrying out my invention, I provide a casing 1 that has a compartment 2 for receiving the gear mechanism. The casing also has cast integrally thereon a stand 3, a sleeve 4, a handle 5, and a standard 6.

The standard 6 houses a sleeve 7 that is rotatively disposed therein, and this sleeve is connected to a bevel gear 8 and to a hemispherical member 9. Inside of the sleeve 7 I mount a shaft 10 that carries a bevel gear 11 at one end and a beating element 12 at its other end.

The bevel gears 8 and 11 mesh with a driving bevel gear 13. This gear has a shaft 14 that is connected to a handle 15. It will be seen thus far that a rotation of the handle 15 will rotate the member 9 and element 12 in opposite directions. Figure 5 shows how the pocket 16 in the element 12 is made square in cross-section for receiving the square end of the shaft 10. In this way the element and the shaft are rigidly connected together.

The member 9 is closed by a member 17 that is also hemi-spherical in shape. A gasket 18 is interposed between the members 9 and 17 for preventing any leakage between the members. The member 17 is secured to the member 9 by a spider 19, this spider having resilient legs that are provided with hook-shaped ends 20 for removably clamping together the beads on the members 9 and 17.

From the foregoing description of the various parts of the device, the operation thereof may be readily understood. The device is disposed in the position shown in Figure 3 and the spider 19 and the member 17 are removed. This permits the element 12 to be removed, and provides a cup-shaped member for receiving the egg. The egg is now broken and its contents are poured into the member 9. The element 12 is now mounted upon the shaft 10, and the member 17 and the spider 19 are secured in place. The device may now be removed from the supporting surface 21 and be held in inverted position during the beating operation. The sphere composed of the members 9 and 17 will be rotated in the direction opposite to that of the element 12, and this will hasten the beating operation.

After the egg has been beaten, the device may be swung back into the position shown in Figure 3, and then the parts 19, 17, and 12 removed, whereupon the beaten egg may be poured from the cup-shaped member 9 into any desired container. The device is extremely simple in construction, and, as stated in the first part of the specification, not only prevents the splashing of the egg during the beating operation, but also houses the gears so as to prevent them from becoming entangled with the garment or fingers of the operator.

Although I have shown and described one embodiment of my invention, it is to be understood that the same is susceptible of various changes, and I reserve the right to employ such changes as may come within the scope of the appended claims.

I claim:

1. An egg beater comprising a spherical container composed of two hemispheres, means for locking said hemispheres together for permitting them to be inverted, a perforated disc-shaped beating element having substantially the same diameter as the inner diameter of the container and means for rotating said container and said beating element in opposite directions.

2. An agitator having a receptacle disposed at one end for receiving the material to be agitated, operating means disposed at the other end of said agitator and being operatively connected to the receptacle, said receptacle being closable for permitting the ready inverting of the agitator.

3. An agitator comprising a support, a receptacle disposed at one end of said support and being entirely closable, actuating means disposed at the other end of said support and being operatively connected to said receptacle, means disposed at the same end of the said support for permitting the receptacle to be held in an inverted position while the device is being operated, and a beating member disposed in said receptacle and being actuated by the operating mechanism.

THOMAS L. FRATES.